United States Patent [19]

Hering, Jr.

[11] Patent Number: 4,891,142

[45] Date of Patent: Jan. 2, 1990

[54] MOVING BED FILTRATION APPARATUS AND METHOD

[75] Inventor: C. J. Hering, Jr., Houston, Tex.

[73] Assignee: Ashbrook-Simon-Hartley Corporation, Houston, Tex.

[21] Appl. No.: 247,397

[22] Filed: Sep. 21, 1988

[51] Int. Cl.$^4$ .......................................... B01D 23/24
[52] U.S. Cl. ................................ 210/792; 210/807; 210/189; 210/290; 210/268; 210/279; 210/285; 210/286
[58] Field of Search ............... 210/792, 807, 268, 189, 210/290, 279, 269, 285, 286

[56] References Cited

U.S. PATENT DOCUMENTS

| | | | |
|---|---|---|---|
| 612,151 | 10/1898 | Bell | 210/290 |
| 1,007,929 | 11/1911 | Deacon et al. | 210/189 |
| 1,123,704 | 1/1915 | Deacon et al. | 210/189 |
| 1,130,382 | 4/1915 | Deacon et al. | 210/286 |
| 1,620,431 | 3/1927 | Bramwell | 210/189 |
| 1,861,295 | 5/1932 | Bramwell | 210/189 |
| 2,057,887 | 10/1936 | Elliott et al. | 210/268 |
| 2,348,854 | 5/1944 | Schreiber | 210/189 |
| 3,382,983 | 5/1968 | Stewart | 210/290 |
| 3,598,235 | 8/1971 | Demeter | 210/268 |
| 3,715,868 | 2/1973 | Biasi | 55/315 |
| 4,060,484 | 11/1977 | Austin et al. | 210/80 |
| 4,126,546 | 11/1978 | Hjelmner et al. | 210/19 |
| 4,197,201 | 4/1980 | Hjelmner et al. | 210/189 |
| 4,787,987 | 11/1988 | Hensley | 210/290 |

FOREIGN PATENT DOCUMENTS 263183 8/1913 Fed. Rep. of Germany.
449431 10/1927 Fed. Rep. of Germany.

OTHER PUBLICATIONS

Parkson Corporation/"DynaSand Filter"/1980.

Primary Examiner—Richard V. Fisher
Assistant Examiner—Cynthia L. Nessle
Attorney, Agent, or Firm—Foley & Lardner, Schwartz, Jeffery, Schwaab, Mack, Blumenthal & Evans

[57] ABSTRACT

A bed of particulate material of varying sizes is located within a vessel. This bed comprises an upper and lower region. Particulate material is supplied continuously to the center of the upper region so as to form a peak shape which descends downwardly and radially outwardly from the center. Liquid to be filtered is introduced to this peak shape and is filtered downwardly through the bed. A majority of the filtered liquid passes through a screen located between the upper and the lower regions into a screen filtrate enclosure. The remaining liquid continues to the lower region. This liquid and dirty particulate material are transported by an air lift tube from the lower region to a position above the upper region. At this position, the particulate material is washed and supplied to the center of the upper region. The remaining liquid and filtered particles are removed from the vessel.

13 Claims, 1 Drawing Sheet

MOVING BED FILTRATION APPARATUS AND METHOD

BACKGROUND OF THE INVENTION

1. Field of the Invention

This invention relates to a method and apparatus for the filtration of a liquid.

2. Discussion of the Prior Art

Filtration of a liquid is desirable in many applications, including but not limited to the removal of suspended solids from sewage effluents at tertiary treatment stages. U.S. Pat. No. 4,060,484 discloses a filtering system for liquids. A bed of particulate material of various sizes is located within a vessel. Material is withdrawn from the base of the bed, cleaned and continuously resupplied to the top of this bed in such a manner so as to form an inclined upper surface. The liquid to be filtered enters the bed through this upper surface and the filtered liquid exits the vessel from a lower side of the vessel. It is desired to increase the efficiency and effectiveness of such a filtering system.

Accordingly, it is an object of the present invention to filter a liquid more efficiently and more effectively.

Other objects and advantages will become apparent in the drawings and specification which follow.

SUMMARY OF THE INVENTION

The foregoing and additional objects are obtained by the present invention. A bed of particulate material of varying sizes is located within a vessel. This bed comprises an upper and lower region. Particulate material is supplied continuously to the center of the upper region so as to form a peak shape which descends downwardly and radially outwardly from the center. Liquid to be filtered is introduced to this peak shape and is filtered downwardly through the bed. A majority of the filtered liquid passes through a screen located between the upper and the lower regions into a screen filtrate enclosure. The remaining liquid continues to the lower region. This liquid and dirty particulate material are transported by an air lift tube from the lower region to a position above the upper region. At this position, the particulate material is washed and supplied to the center of the upper region. The remaining liquid and filtered particles are removed from the vessel.

DETAILED DESCRIPTION OF THE PREFERRED EMBODIMENTS

Figure 1:
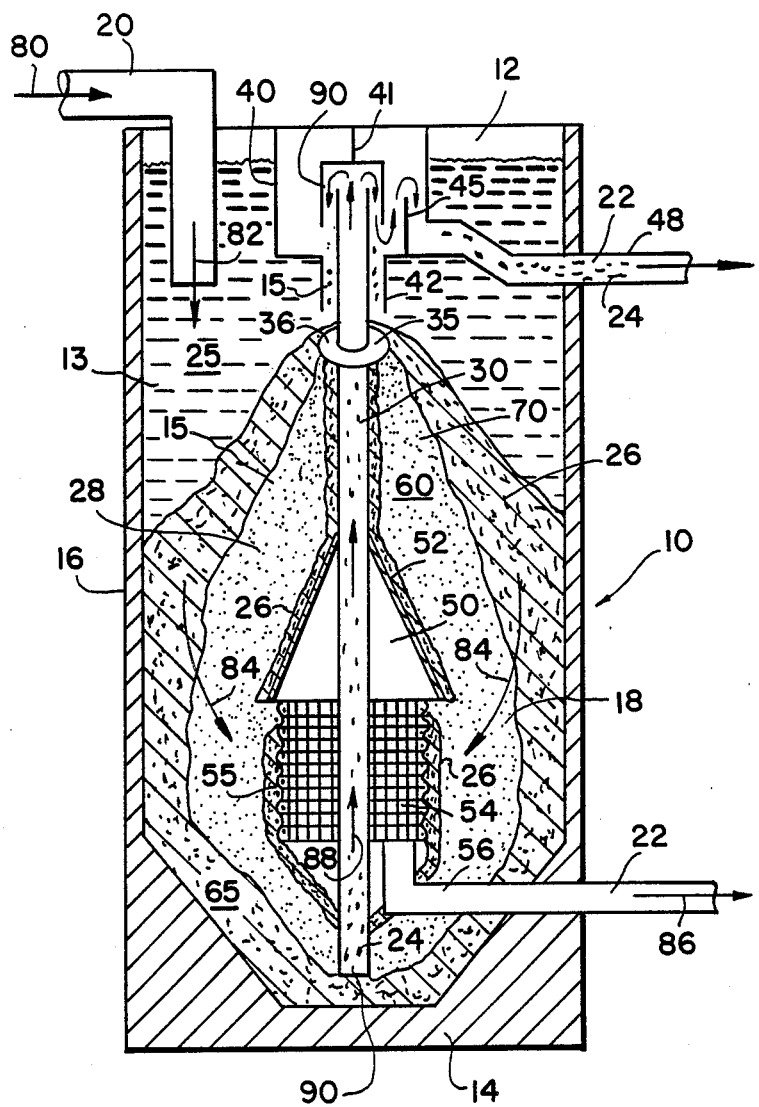
FIG. 1 is an exposed side view of the present invention.

In the following description, and in the accompanying drawing, like reference numerals, as used among the various figures of the drawing, refer to like features or elements among the various figures and embodiments.

Referring to FIG. 1, filter 10 is seen to comprise a vessel 12. Vessel 12 is defined by a base 14 and side walls 16. In a specific embodiment of the present invention, vessel 12 is a cylinder, or it may be a rectangular compartment or compartments. Vessel 12 contains a bed 18 of particulate filter material 15 and an influent chamber 13. Bed 18 has an upper region 60 and a lower region 65. Particulate filter material 15 may be sand. Regardless of the particulate material selected, the filter material is comprised of coarse filter material 26 and fine filter material 28. Upper region 60 is characterized by a peak shape 70 located at its top. Peak shape 70 has an exterior comprised predominately of coarse filter material 26 and an interior comprised predominately of fine filter material 28. Bed 18 has a similar exterior and interior. Bed 18 and peak shape 70 also have a center core of coarse filter material 26 extending through them.

Filter material 15 is supplied to the peak shape 70 at bed 18 by feed tube 42. Feed tube 42 is located above the center of upper region 60. As supplied material 15 contacts the peak shape 70, the particles of material 15 classify. The larger particles of coarse filter material 26 tend to roll down the slope of peak shape 70, while the smaller particles of fine filter material 28 tend to flow vertically through peak shape 70 and the bed 18.

Unfiltered liquid 25 flows into influent chamber 13 of vessel 12 via influent line 20 for filtration, as indicated by arrow 80. It will be apparent from the drawing that the unfiltered, dirty, liquid influent 25 collects above the bed 18 such that the top of the dirty liquid is at a level above the bed 18. Influent line 20 turns downward. Accordingly, this change in flow, coupled with the force of gravity, causes unfiltered liquid 25 to flow in a downward direction, as indicated by arrow 82. Thus, unfiltered liquid 25 flows downward through the exterior of peak 70, which is comprised predominately of coarse filter material 26. Filtration of liquid 25 begins as particles 24 and liquid 25 are trapped by coarse filter material 26.

Liquid 25 will flow through a path through which it encounters the least resistance. This path of least resistance is through coarse filter material 26 since the spaces between the particles of material 26 are larger than those between the particles of fine filter material 28. Accordingly, the initial filtration is effected by coarse filter material 26.

Liquid 25 flows through the interior bed 18 towards a screened enclosure 54 located in the center of lower region 65, as indicated by arrow 84. The passage of liquid 25 to the interior of bed 18, which is comprised predominately of fine filter material 28, causes further filtration of liquid 25 and results in filtrate 22 entering screen filtrate enclosure 54 via screen 55. Filtrate 22 exits screen filtrate enclosure 54 and vessel 12 via filtrate line 56, as indicated by arrow 86.

While this filtration is taking place, "dirty" particulate filter material 15 is withdrawn continuously from lower region 65. Material 15 is "dirtied" by particles 24 removed from liquid 25. Also continuously withdrawn is transport liquid 90 which does not flow into screen filtrate enclosure 54. This transport liquid 90 serves both as a travel medium and a wash for dirtied filter material 15. Both this transport liquid 90 and dirty filter material 15 are withdrawn from lower region 65 upwards through bed 18 via air lift tube 30, as indicated by arrow 88. This withdrawal is accomplished using the air lift principle. In addition, walls 16 may slope inwardly and downwardly towards base 14 in lower region 65 in order to direct filter material 15 and liquid 90 towards air lift tube 30. It will be apparent from the foregoing and from the drawing that the transport liquid 90 will have passed through filter material 15 before it can reach lower region 65, and thus it will be a clean filtered liquid. It will also be apparent that the dirty filter material 15 is, accordingly, transported entirely with clean filtered transport liquid 90 independently of the introduction of unfiltered liquid 25 above the bed 18.

Air lift tube 30 forcefully deposits the transport liquid 90 and dirtied filter material 15 in wash assembly 40. Liquid 90 and dirtied filter material 15 are directed downward by deflector 41 to the bottom portion of wash assembly 40. This deflection results in a washing or separation of particles 24 from filter material 15.

Feed tube 42 extends from the bottom portion of wash assembly 40 and allows communication between transport liquid 25 in wash assembly 40 and unfiltered liquid 25 in influent chamber 13. This unfiltered liquid 90 is a level above that of liquid 25 in wash assembly 40. Thus, the dirty filter material is transported to a position at the center of the upper region of the bed which is below the level of unfiltered liquid 25 above the bed 18. This difference in levels results in a flow of liquid 25 from influent chamber 13 into wash assembly 40 upwardly via tube 42 against the downward flow of relatively heavy filter material 15 to complete the washing of the filter material 15. Because particulate filter material 15 is heavier than dirt particles 24, the filter material drops out of wash assembly 40 via tube 42 under the force of gravity, while dirt particles 24 float out wash assembly 40 via line 48. Thus, clean filter material 15 is supplied continuously to peak shape 70.

More specifically, liquid 25 and particles 24, collectively referred to as "reject," exit wash assembly 40 via reject line 48. The flow of reject is controlled by an adjustable weir 45. Weir 45 establishes the level of reject in wash assembly 40 and thereby controls the flow of reject through reject line 48. Accordingly, reject exits filter 10.

A circular plate 35 may be provided just below feed tube 42. Circular plate 35 has an upper surface 36 which slopes downward from the center of plate 35. Air lift tube 30 passes through plate 35. Downward sloping upper surface 36 results in coarse filter material 26 being directed radially inward and downward along air tube 30 towards screen filtrate enclosure 54.

A hood 50 with inclined edges 52 is located directly above screen filtrate enclosure 54. Inclined edges 52 extend horizontally beyond screen filtrate enclosure 54. As filter material 15 is withdrawn from lower region 65, the filter material 15 in bed 18 moves downward and comes into contact with the inclined edges 52 of hood 50. Inclined edges 52 have the effect of directing downward-moving coarse filter material 26 against the screen 55 of screen filtrate enclosure 54. The coarse filter material 26 prevents adjacent fine filter material 28 from entering screen filtrate enclosure 54 and thereby contaminating filtrate 22.

The peak shape 70 of the present invention allows for an increased area of coarse filter material 26 to be exposed to liquid 25, thereby increasing the efficiency of filtration. It will be apparent that, in forming the peaked shape, all of the cleaned or washed filter material supplied to the upper region of the bed is deposited by gravity only at the center of the upper region of the bed 18 to form only a single peak shape 70 at the upper region of the bed.

Although the invention has been described with reference to a set of specific exemplary embodiments, it is to be understood that many modifications, variations and equivalents are possible within the spirit and scope of the invention and defined in the appended claims.

What is claimed is:

1. A method of filtering a liquid comprising the steps of:

providing a bed of particulate filter material comprising particles of various sizes, including coarse filter material and fine filter material contained within a vessel, the bed having an upper and a lower region;

withdrawing the filter material from the lower region of the bed;

supplying filter material to the center of the upper region of the bed in a manner so as to produce a freely formed peak shape at the upper region of the bed, which peak shape descends downwardly and radially outwardly from the center, said supplying step including classifying the particulate filter material of various sizes so that coarse filter material forms the exterior of the peak shape and of the bed and the fine filter material forms the interior of the peak shape and of the bed;

introducing the liquid to be filtered above the peak shape so that liquid is filtered through the bed in a downward direction; and removing the filtered liquid from a position in the lower region of the bed.

2. The method of claim 1, wherein said withdrawing step includes transporting the filter material from the lower region to the top of the vessel and wherein said supplying step includes supplying this transported filter material continuously from the top of the vessel.

3. An apparatus for the filtration of a liquid comprising:

a vessel having a base and side walls;

a bed of particulate filter material comprising particles of various sizes, including coarse material and fine filter material, said bed being located within said vessel and said bed having an upper region and a lower region;

a means for withdrawing said filter material from the lower region of said bed;

a means for supplying said filter material to the center of the upper region in a manner so as to produce a freely formed peak shape at the upper region of the bed, which peak shape descends downwardly and radially outwardly from the center;

a means for classifying the particulate filter material of various sizes so that coarse filter material forms the exterior of the peak shape of the bed and fine filter material forms the interior of the peak shape of the bed;

a means for introducing the liquid to be filtered above the peak shape so that liquid is filtered through the bed in a downward direction; and a means for removing the filtered liquid from a position in the lower region of the bed.

4. The apparatus of claim 3, wherein said means for withdrawing includes a means for transporting the filter material from the lower region to the top of the vessel and wherein said means for supplying communicates with said means for transporting to continuously supply said peak shape with filter material.

5. The apparatus of claim 3 further comprising a second means for classifying the filter material, said second means for classifying being located below said means for supplying.

6. The apparatus of claim 3, wherein said side walls of said vessel slope inwardly in the lower region of said bed.

7. The apparatus of claim 3, wherein said means for withdrawing is an air lift tube.

8. The apparatus of claim 3, wherein said means for removing comprises a screened filtrate enclosure and a conduit which flows from said vessel.

9. The apparatus of claim 4, wherein said means for transporting is an air lift tube.

10. The apparatus of claim 5, wherein said second means for classifying according to particle size includes a hood having an inclined surface, said hood being located within said bed of particulate filter material and below the peak shape.

11. A method of filtering a liquid comprising the steps of:
providing a bed of particulate filter material comprising particles contained within a vessel, the bed having an upper and a lower region;
introducing unfiltered liquid above the bed, which liquid is filtered through the bed in a downward direction, said unfiltered liquid collecting above the bed such that the top of the unfiltered liquid is at a level above the bed;
removing one portion of clean, filtered liquid from a position in the lower region of the bed, wherein the removing portion of said clean, filtered liquid forms a transport liquid;
withdrawing dirty, particulate filter material from the lower region of the bed;
transporting the dirty filter material entirely with said clean filtered transport liquid from a position in the lower region of the bed to a location at the center of the upper region of the bed and below the level of the unfiltered liquid above the bed, said transporting step being independent of said introducing step;
separating dirt from the dirty particulate material at said location at the center of the upper region of the bed and below the level of the dirty liquid above the bed; and
depositing clean, separated filter material at the center of the upper region of the bed.

12. The method of claim 11, wherein said depositing step includes producing a freely formed peak shape at the upper region of the bed, which peak shape descends downwardly and radially outward from the center.

13. The method of claim 12, wherein said depositing step includes depositing all of the cleaned filter material to be supplied to the upper region of the bed by gravity only at the center of the upper region of the bed to form only a single peak shape at the upper region of the bed.

* * * * *